(12) United States Patent
Collot et al.

(10) Patent No.: US 6,595,401 B2
(45) Date of Patent: Jul. 22, 2003

(54) BLADE MAINTENANCE TOOL, AND ITS APPLICATION TO FRICTION WELDING OF BLADES

(75) Inventors: André-Claude-Félix Collot, Mennecy (FR); Jean-Pierre Ferte, Corbeil-Essonnes (FR)

(73) Assignee: Snecma-Moteurs, Paris (FR)

( * ) Notice: Subject to any disclaimer, the term of this patent is extended or adjusted under 35 U.S.C. 154(b) by 0 days.

(21) Appl. No.: 09/998,669

(22) Filed: Dec. 3, 2001

(65) Prior Publication Data

US 2002/0070492 A1 Jun. 13, 2002

(30) Foreign Application Priority Data

Dec. 7, 2000 (FR) .............................. 00 15891

(51) Int. Cl.[7] ................... B23K 37/04; B23K 20/12; B23Q 3/06; B25B 5/14
(52) U.S. Cl. ................... 228/44.3; 228/112.1; 228/212; 269/104; 269/107
(58) Field of Search ............... 228/2.1, 2.3, 44.3, 228/47.1, 49.1, 49.4, 119, 212, 213, 112.1, 113, 114, 114.5; 29/889, 889.1, 889.7, 889.71, 889.72, 889.721, 889.722; 269/104, 107

(56) References Cited

U.S. PATENT DOCUMENTS

| | | | | |
|---|---|---|---|---|
| 3,818,646 A | * | 6/1974 | Peterson | 451/365 |
| 4,128,929 A | * | 12/1978 | DeMusis | 29/889.1 |
| 4,222,172 A | * | 9/1980 | Mason | 33/548 |
| 4,255,086 A | * | 3/1981 | Roberts | 416/218 |
| 4,448,405 A | * | 5/1984 | Cipolla | 269/32 |
| 4,638,602 A | * | 1/1987 | Cavalieri | 451/365 |
| 4,737,417 A | * | 4/1988 | Mushardt et al. | 428/571 |
| 4,829,720 A | * | 5/1989 | Cavalieri | 451/365 |
| 4,836,518 A | * | 6/1989 | Janutta | 269/43 |
| 4,951,390 A | * | 8/1990 | Fraser et al. | 29/889.1 |
| 5,081,765 A | * | 1/1992 | Fraser et al. | 29/889.1 |
| 5,148,957 A | * | 9/1992 | Searle | 228/2.1 |
| 5,149,073 A | * | 9/1992 | Fraser | 269/297 |
| 5,183,244 A | * | 2/1993 | Ortolano et al. | 269/43 |
| 5,503,589 A | * | 4/1996 | Wikle | 451/5 |
| 5,527,435 A | * | 6/1996 | Arnau | 205/640 |
| 5,544,873 A | * | 8/1996 | Vickers et al. | 269/47 |
| 5,551,623 A | | 9/1996 | Collot et al. | |
| 5,560,841 A | * | 10/1996 | DeMichael et al. | 219/85.1 |
| 6,007,628 A | * | 12/1999 | Ittleson et al. | 118/500 |
| 6,139,412 A | * | 10/2000 | Dwyer | 451/365 |
| 6,244,495 B1 | * | 6/2001 | Rapp et al. | 228/44.3 |

FOREIGN PATENT DOCUMENTS

| | | |
|---|---|---|
| DE | 4237052 A1 * | 5/1994 |
| EP | 0 669 183 | 8/1995 |
| EP | 0 718 069 | 6/1996 |
| EP | 1 000 696 | 5/2000 |
| EP | 1 000 697 | 5/2000 |

* cited by examiner

Primary Examiner—Tom Dunn
Assistant Examiner—Kiley Stoner
(74) Attorney, Agent, or Firm—Oblon, Spivak, McClelland, Maier & Neustadt, P.C.

(57) ABSTRACT

A tool for holding a blade blank (1) comprises a frame (13) in which a control system using clamping jaws (18, 19) and lifters (30, 34, 35) grips the blade and holds it in position vertically on two supporting faces (22, 23), while the blade has been laid on three lateral faces (41, 42, 43). The blade is thus simultaneously held in a precise position and gripped sufficiently tightly, with a single control main mechanism. The mounting of the blade is thus greatly simplified and it may be subjected without further precaution to a manufacturing operation such as welding by friction to a rotor disk.

23 Claims, 6 Drawing Sheets

BLADE MAINTENANCE TOOL, AND ITS APPLICATION TO FRICTION WELDING OF BLADES

The subjects of this invention are a tool for holding a blade and application of this tool to friction welding of blades.

Some machine rotors include what are called monobloc bladed disks, i.e. rotor portions to which rotating blade stages are united rigidly by welding, unlike the traditional design, in which blade stands with bulb or swallow-tail shapes, or another shape of the same type, are slid into disk grooves of a complementary section. Monobloc disks are generally lighter, and this is the reason why they are preferred.

Disks proper are generally manufactured with blade sleeves, and the blades are formed separately and welded on the sleeves by a process which is normally friction welding. Finally, excess thicknesses of the blades are removed by machining. A weak point of this manufacturing process is that the blades must be held firmly during the welding, which may be problematic if they have a complex shape, notably a twisted one. In French patent 2 716 397 which covers friction welding of blades, the blades are retained between clamping jaws which press on approximately their entire perimeter near the edge for connection to the blade sleeves. This solution is practicable but does not necessarily allow the blade to be positioned with great accuracy in the machine nor at an invariable position. In addition, machining of clamping jaws with a complex supporting face may be difficult to achieve with satisfactory accuracy.

An improved tool for holding a blade is proposed as the invention. To summarise, it comprises: a frame fitted with three blade lateral supporting faces, of which a first upper supporting face is close to the top of the blade, and two lower supporting faces are close to lower portions of the blade's trailing and leading edges; a mobile blade lock on the frame opposite the upper supporting face; two mobile clamping jaws on the frame directed towards the lower portions of leading and trailing edges in approximately concurrent but not aligned directions, and also directed approximately towards the lower supporting faces; a clamping jaw control system; and two vertical blade supporting faces.

Precise positioning of the blade is guaranteed by the support on the five faces; the clamping jaws grip the blade positioned firmly on the frame, whilst holding it on the lower lateral supports; finally, the lock is used to hold the blade pressing on the upper supporting face.

The clamping jaws are advantageously in the shape of corners penetrating into recesses of the blade made beforehand. Similarly, it is advantageous if the vertical supporting faces are formed by upper faces of the clamping jaws, faces which are horizontal, while the lower faces of the clamping jaws are inclined to make the corner used for tightening.

The control system may include transmission lifters pushing on rear faces of the clamping jaws; in the preferred forms of the invention, it is planned that these transmission lifters should include mechanisms for pushing back the clamping jaws to stop tightening of the blade when the lifters are removed, allowing the tool to be released.

This tool is easily compatible with a single control system which may include, after a control organ advantageously constituted by a screw and nut transmission system, an activation lifter acting on both the transmission lifters mentioned above.

Other aspects of the invention and their advantages will be seen more clearly on reading the description which follows in relation to the figures.

Figure 1:
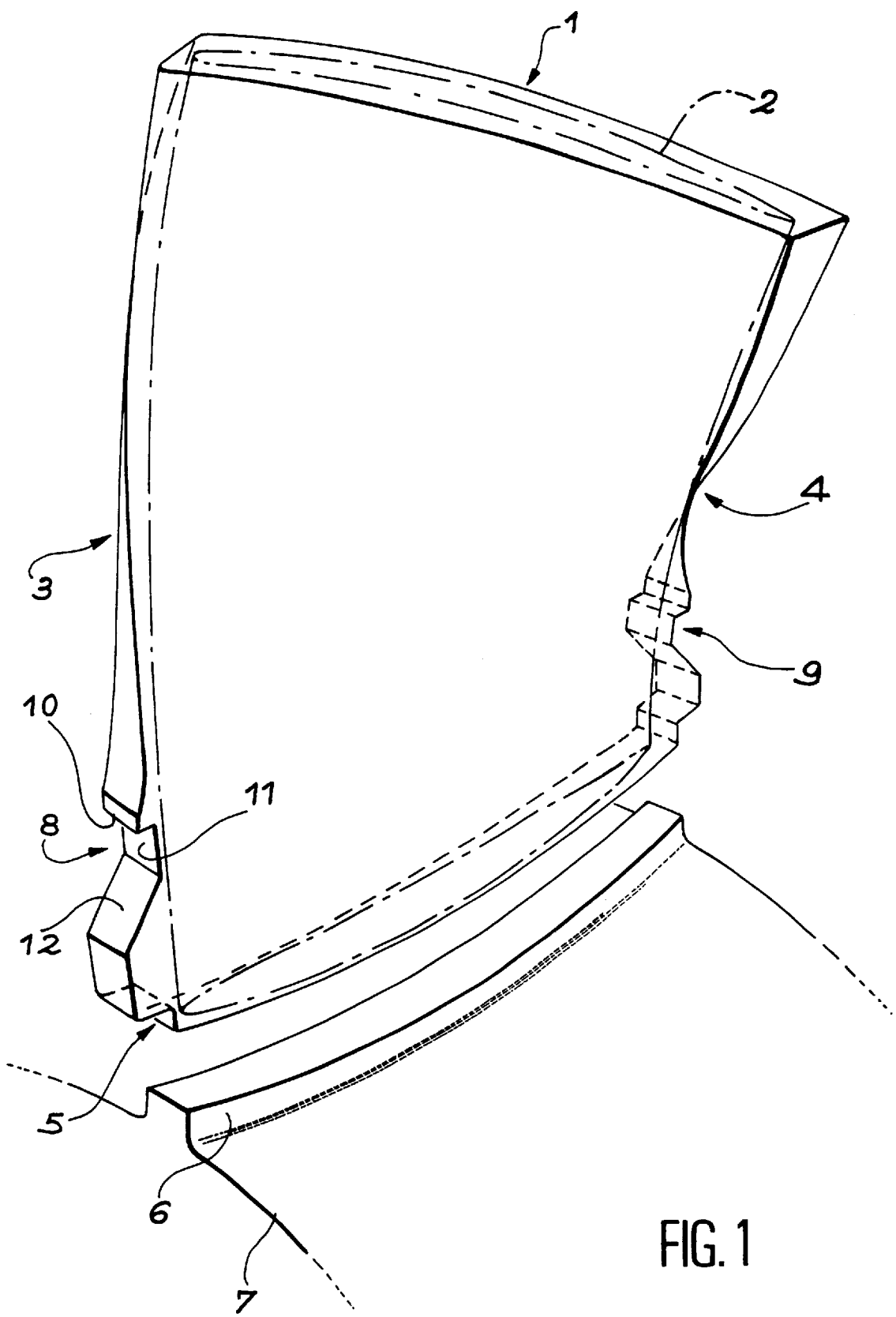
FIG. 1 is a general view of a blade intended to be incorporated in a monobloc bladed disk by friction welding using the process for which the invention's tool was designed.

A monobloc bladed disk blade blank may be obtained from forging, machining or twisting of sheet metal as is clearly show in FIG. 1. This blade blank bears reference 1, and the blade in the finished state is represented in dashed lines; after welding, it will be machined by suction face and blade face milling which will remove the excess thicknesses of blank 1, and the leading edge regions 3 and trailing edge regions 4 will also be machined appropriately. Blank 1 also contains a lug 5 intended to be consumed during the friction welding. A sleeve 6 on a disk 7 to which the blank must be welded is shown. Two recesses 8 and 9 have been made in blank 1 in the lower part of the leading and trailing edges 3 and 4 respectively, and recesses 8 and 9 are delimited by an upper supporting face 10, a bottom face 11, and a lower sloping face 12.

Figure 2:
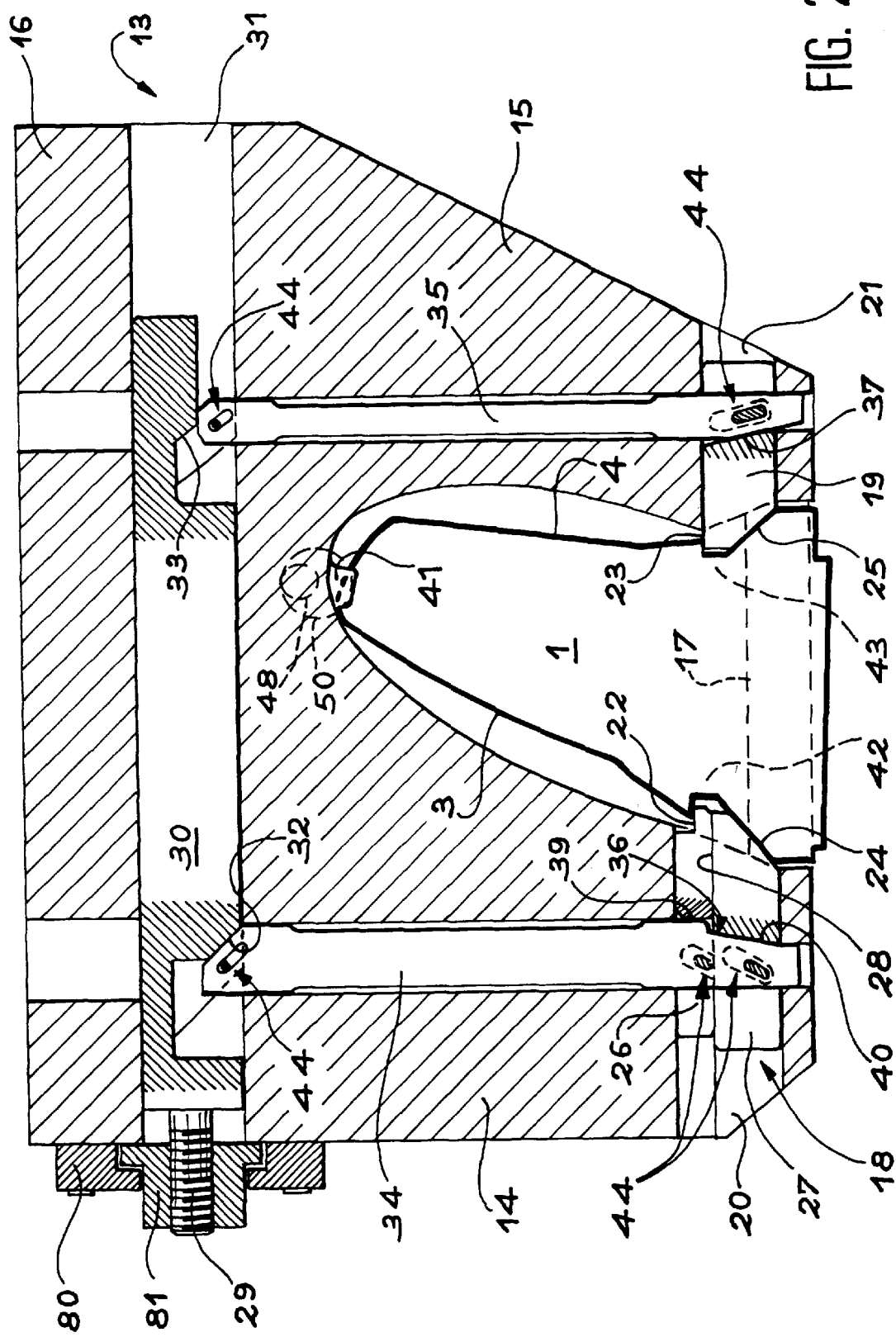
FIG. 2 is a general view of the tool.

Refer to FIG. 2 which illustrates the blank 1 held in the tool in accordance with the invention. The latter comprises a frame 13 consisting essentially of two columns 14 and 15 rising up on either side of blank 1, beside leading edge 3 and trailing edge 4, and a head 16 linking the tops of columns 14 and 15. A canvas 17 illustrated mainly in FIG. 3 can link columns 14 and 15 to stiffen frame 13 and provide improved support to blank 1, as will be shown below.

Figure 3:
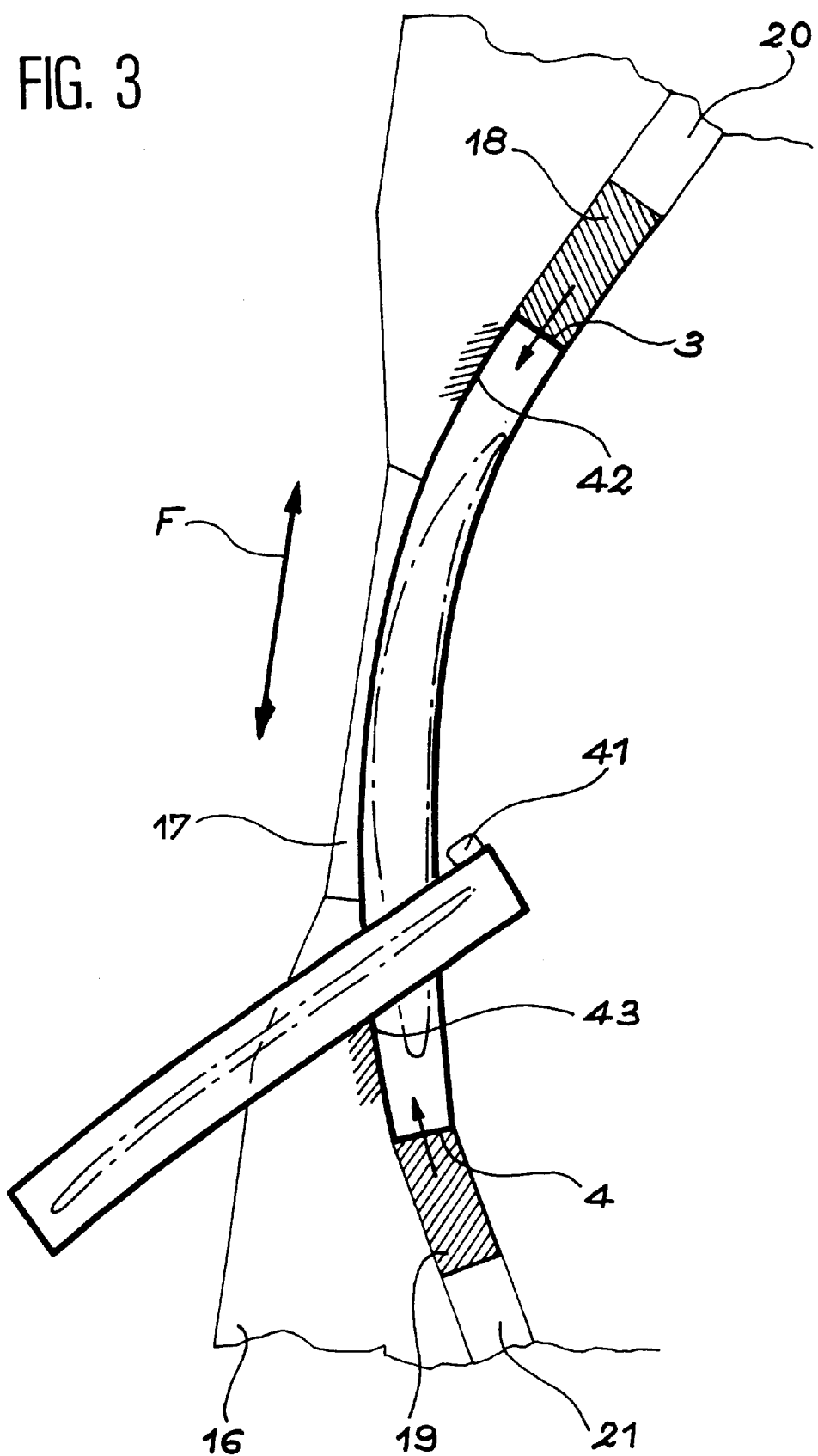
FIG. 3 is a partial view from above essentially representing the surfaces supporting the blade against the tool and the gripping jaws.

Clamping jaws 18 and 19 are arranged at the bottoms of columns 14 and 15 and slide into horizontal grooves 20 and 21 the directions of which are concurrent, as can be seen in FIG. 3, but not, however, aligned. Clamping jaws 18 and 19 each bear a horizontal supporting face, respectively 22 and 23, in their upper part and a sloping face, 24 or 25, respectively at their end resting on the blade. In addition, if clamping jaw 19 is unitary, clamping jaw 18 consists of two superimposed portions 26 and 27, separated by a horizontal surface 28, the first of which bears supporting face 22 and the second sloping face 24.

The tool also comprises a control system comprising a single control organ in the form of a nut 81 held by a collar 80 on a lateral side of column 14, a screw 29 engaged in nut 81, a horizontal activation lifter 30 sliding in a groove 31 of head 16 and fixed to screw 29, and which comprises two lifter surfaces 32 and 33 inclined in the same direction; and lastly the control system comprises two rods 34 and 35 or vertical transmission lifters, sliding in columns 14 and 15, and comprising at their upper ends surfaces for sliding on the lifter surfaces 32 and 33 of activation lifter 30 and, at their lower ends, lifter surfaces 36 and 37 intended to act on additional sliding surfaces of clamping jaws 18 and 19. As clamping jaw 18 is divided, the corresponding lifter surface 36 is also divided into an upper portion 39 jutting out over a lower portion 40, and these are associated respectively with portions 26 and 27 of this clamping jaw 18.

Blank 1 is mounted in the tool as follows. With clamping jaws 18 and 19 retracted, blank 1 is positioned between columns 14 and 15 on the two horizontal supporting faces 22 and 23 and on three lateral support faces, one of which is an upper supporting face 41 located under head 16 and the two others of which are lower support faces 42 and 43 established close to columns 14 and 15 and on which blank 1 is positioned by portions adjacent to recesses 8 and 9.

When blank 1 has been positioned, the control system is activated by turning nut 81: activation lifter 30 is displaced to the left of FIG. 1 so that its lifter surfaces 32 and 33 weigh on rods 34 and 35 and lower them; lifter surfaces 36 and 37 of rods 34 and 35 weigh in their turn on clamping jaws 18 and 19 and bring them close to one another until they enter recesses 8 and 9 and wedge blank 1. The tightening must be sufficient to stop all play and perfectly immobilise the blade in the tool. The efforts perpendicular to the welding surface and parallel to the friction direction will pass from the tool into the blade by tightening of sloping surfaces 24 and 25 of clamping jaws 18 and 19. These surfaces, together with the lower sloping surfaces 12 of blank 1 which correspond to them, must be dimensioned accordingly, which will require for blank 1 that these portions of the leading edge 3 and trailing edge 4 regions are of a certain thickness. They are arranged as close as possible to the welding zone to prevent transmission of efforts throughout the height of the blade, which is twisted. The other elements of the tool will also be defined so as to transmit the efforts satisfactorily.

FIG. 3 shows that the efforts which clamping jaws 18 and 19 exert reinforce the support of blank 1 on the lower supporting faces 42 and 43 since their displacement directions are not aligned but directed towards these faces. This allows blank 1 to be retained firmly during the friction welding despite the efforts to which it is subjected. Here, clamping jaws 18 and 19 slide essentially in the direction of the blade to leading and trailing edges 3 and 4, which is sufficient if the friction movement is directed in accordance with arrow F in the direction of the line of the blade; if the friction movement is applied in the other direction, clamping jaws 18 and 19 will probably push blank 1 more freely against the lower supporting faces 42 and 43.

Certain synchronisation subtleties must be noted. It is useful if the blade is completely held before tightening. This is why clamping jaw 18 has been divided: its upper portion 26 is displaced by the surface of lifter 39 before its lower portion 27 is displaced by the surface of lifter 40, such that the upper face 22 enters into recess 8 and provides the desired horizontal support on this side at any earlier stage of the control; similarly, upper face 23 of the other clamping jaw 19 rapidly comes under face 10, corresponding to the other recess 9.

There is another dissymmetry at the location of the lifter surfaces 32 and 33 of the activation lifter 30: lifter surface 33 associated with rod 35 and unitary clamping jaw 19 is arranged so that it completes its action before that of the other lifter surface 32; the result of all the foregoing is that when the horizontal support of the blade on faces 22 and 23 has been achieved, the upper portion 26 of clamping jaw 18 becomes immobile while clamping jaw 19 continues to advance and, lastly, the lower portion 27 of clamping jaw 18 starts to advance and continues to do so when unitary clamping jaw 19 has been immobilised, with rod 35 having gone beyond lifter surface 33, such that the tightening of the blade between the sloping sides 24 and 25 of clamping jaws 18 and 19 is only then completed by continuing to turn nut 81. This independence of the positioning and tightening operations, despite the uniqueness of the control system, is very advantageous in mounting blank 1 in the desired position in the tool without difficulty.

Figure 4:
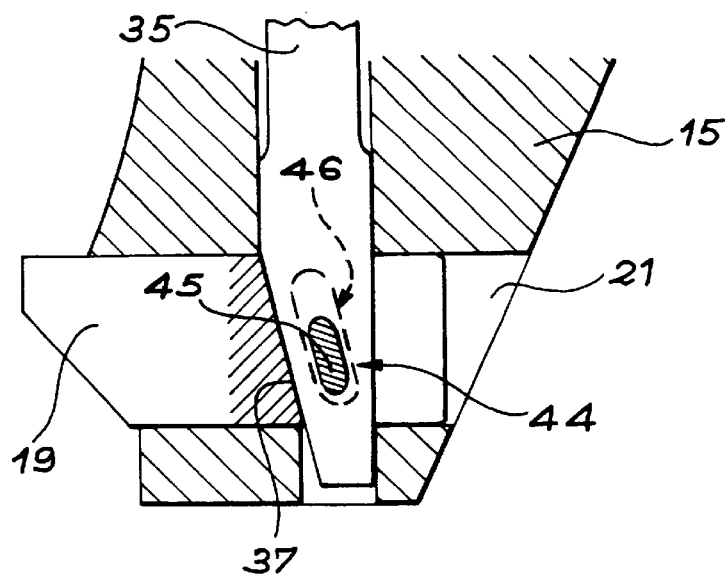
FIGS. 4 and 5 are a vertical cross-section and a horizontal cross-section of a lifter mechanism in accordance with the invention.
Figure 5:
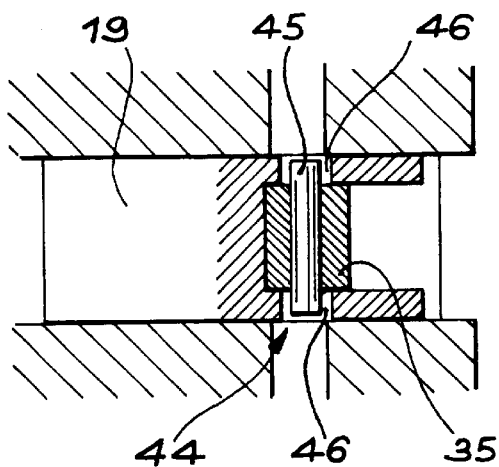

The control system is also suitable for retracting clamping jaws 18 and 19, and also rods 34 and 35 when the welding of blank 1 on sleeve 6 has been finished: systems such as that of FIGS. 4 and 5 are used, arranged between rod 35 and unitary clamping jaw 19, and which bear indistinctly reference 44: they include at least one slug 45, here engaged through rod 35 and going laterally beyond it, and a support surface 46 opposite slug 45 and arranged on clamping jaw 19. This supporting surface 46 is secant to the retraction direction of clamping jaw 19 and sloping towards blank 1 when it is traversed in the upward direction. When rod 35 rises slug 45 touches this surface 46 and pushes it back, which causes clamping jaw 19 to retract and release blank 1. This retraction mechanism 44 exists, in identical or near-identical forms, between the activation lifter 30 and each of rods 34 and 35, between rod 34 and each of the portions 26 and 27 of clamping jaw 18 and, as we have seen, between rod 35 and clamping jaw 19. A retraction control applied to nut 81 leads to a movement of activation lifter 30 to the right, and causes rods 34 and 35 to rise, and clamping jaws 18 and 19 to be retracted.

Figure 6:
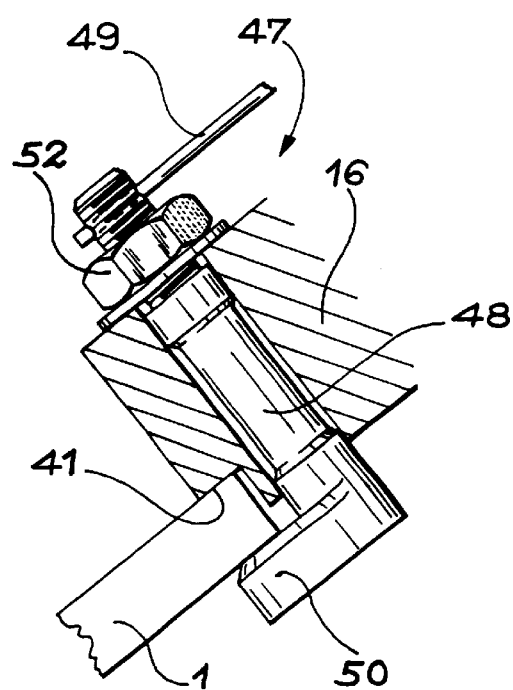
FIG. 6 represents the lock used at the top of the tool.

A final element of the invention will be described in relation to FIG. 6: this is lock 47 comprising an axis 48 engaged through head 16 of frame 13 and connected to a handling handle 49 on one side of head 16 and to a latch 50 on the other side. Rotating handle 49 causes latch 50 to rotate and can bring it in front of upper supporting face 41, which immobilises blank 1 in this place and prevents any tilting during the friction welding. A nut 52 engaged on a threaded portion of axis 48 can retain lock 47 by tightening axis 48 on frame 13, between nut 52 and latch 50. The support is, it will be seen, provided on the upper supporting face 41.

Figure 7:
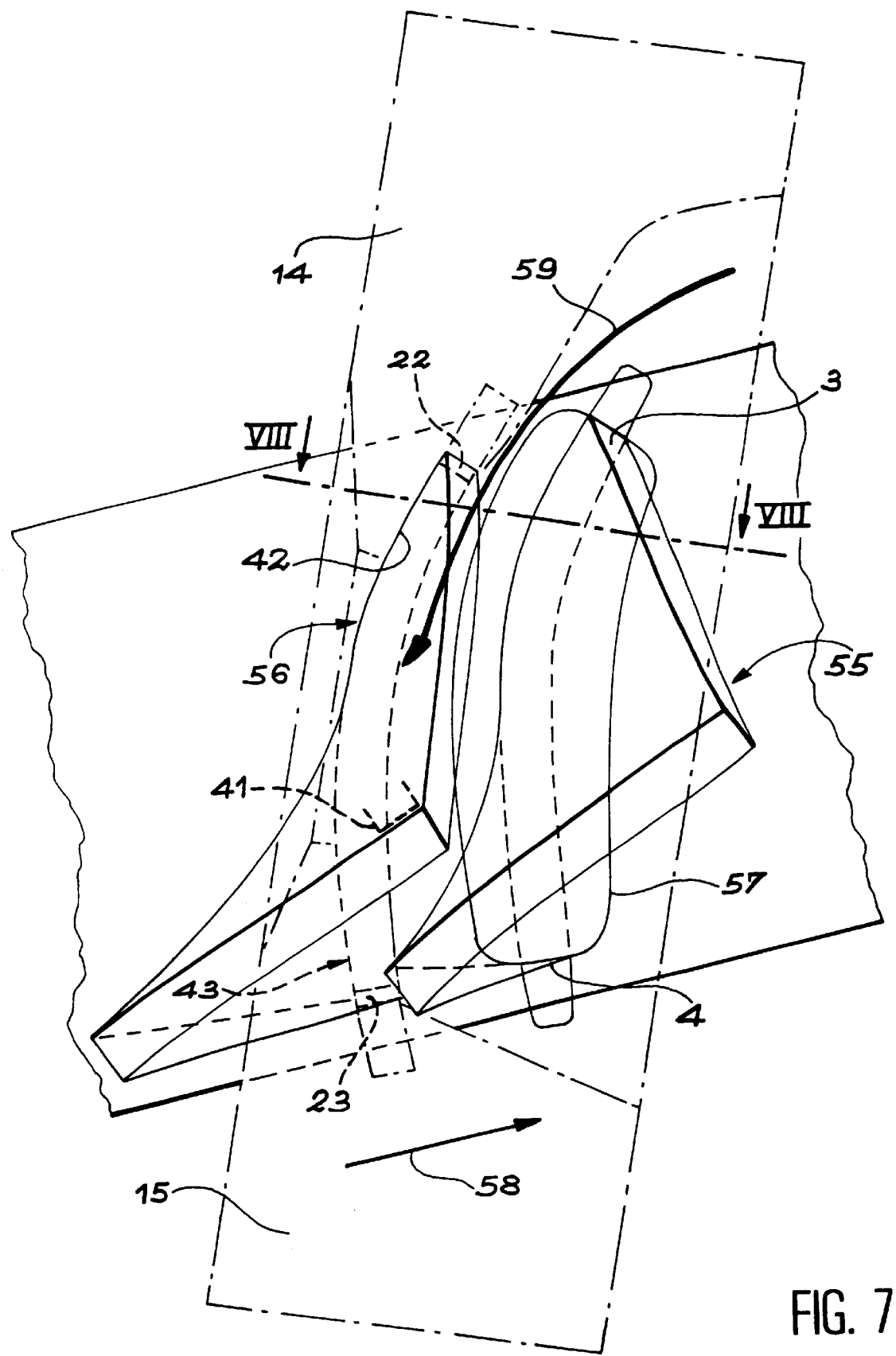
FIGS. 7 and 8 illustrate the insertion of a new blade in the tool.
Figure 8:
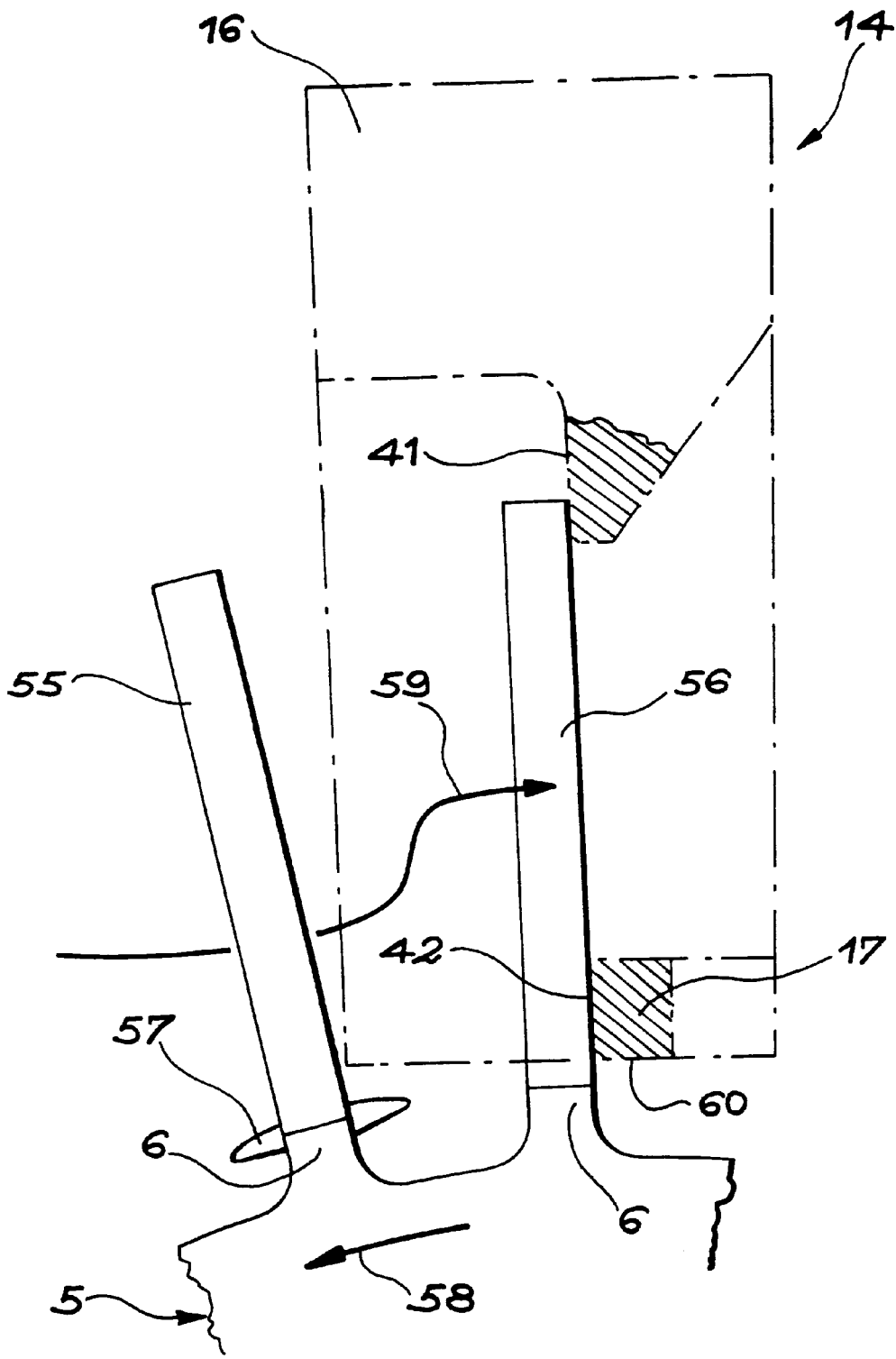

The friction welding operation is undertaken traditionally, with frame 13 in which blank 1 has been fixed being of a single piece with one of the mutually mobile parts of the machine, the other part of which holds disk 7. A more detailed description will, however, be given of the successive insertion of blade blanks 1 in the tool and on disk 7. FIGS. 7 and 8 illustrate, respectively as a view from above and a sideways view, the tool, disk 7 and two blanks, the first of which is a blank 55 already welded to its sleeve 6 and fitted with a welding flange 57, the second being a new blank 56 similar to blank 1 considered up to this point. When welding of blank 55 is finished, clamping jaws 18 and 19 are opened, the tool is slightly raised to separate it from flange 57 and disk 7 is rotated by one blade step in the direction of arrow 58. The new blank 56 is then positioned on its sleeve 6 and against the lateral supporting faces 41, 42 and 43 by a crossways and sinuous movement represented by arrow 59, which passes it between the tool and the welded blank 55, and above flange 57. The tool is then put back in position, clamping jaws 18 and 19 tightened, and the friction welding starts again. It will be noted that lower face 60 of canvas 17, which extends slightly above the welding joint, limits the rise of the flange which is then formed and prevents it hindering insertion of the following blank.

The tool is removed from the machine only when the final blank has been welded. After welding the final blade, it is then easier to remove the tool if canvas 17 is removable.

The tool is, more generally, dimensioned to allow successive welding of all the blades of disk 7 without having to remove it: columns 14 and 15 in particular must not excessively envelope the new blank 56 and frustrating the insertion movement; nor must they be too thick at the rear of the new blank 56 so as not to be hit by the blade welded first, at the end of the welding on disk 7.

Finally, it will be noted that the tool could immobilise blanks without lug 5, which could be welded otherwise than by friction to disk 7, since it does not obtain support from this lug 5.

Since the invention does not relate either to friction welding machines proper, nor to welding processes, there is no point in describing these here.

What is claimed is:

1. A tool for holding a blade, comprising: a frame (13) fitted with three faces (41, 42, 43) providing lateral support for the blade (1) a first upper supporting side of which is close to a top of the blade and two other lower supporting faces which are close to lower portions of trailing and leading edges (3, 4) of the blade; a mobile blade lock (47) on the frame and opposite the upper supporting face; two mobile clamping jaws (18, 19) on the frame and directed towards the lower portions of leading and trailing edges in approximately concurrent but not aligned directions, and also directed approximately towards the lower supporting faces; a clamping jaw control system; and two horizontal supporting faces (22, 23) of the blade.

2. A tool for holding a blade according to claim 1, in which the clamping jaws are in the shape of corners penetrating into recesses (8, 9) of the blade at places in the leading and trailing edges.

3. A tool for holding a blade according to claim 2, in which the horizontal supporting faces are formed by horizontal upper faces (22, 23) of the clamping jaws, while lower faces (24, 25) of the clamping jaws are inclined.

4. A tool for holding a blade according to claim 3, in which one of the clamping jaws (18) is divided into two superimposed portions (26, 27).

5. A tool for holding a blade according to claim 4, in which the control system comprises transmission lifters (34, 35) pushing on surfaces behind the clamping jaws.

6. A tool for holding a blade according to claim 5, in which the control system includes a single activation organ (81) for both clamping jaws (18, 19).

7. A tool for holding a blade according to claim 6, in which the activation organ is linked to an activation lifter (30) with two lifter surfaces (32, 33) which it causes to be displaced.

8. A tool for holding a blade according to claim 7, in which the transmission lifters (34, 35) are rods pushing on the clamping jaws (18, 19) by lower ends and the lifter surfaces (32, 33) of the activation lifter push on the upper ends of the rods.

9. A tool for holding a blade according to claim 8, in which the rods are vertical, extend in two columns (14, 15) of the frame (13), and the activation lifter (30) is horizontal and extends in a head (16) of this frame (13).

10. A tool for holding a blade according to claim 5, in which the transmission lifters include mechanisms (44) to retract the clamping jaws.

11. A tool for holding a blade according to claim 8, in which the activation lifter includes mechanisms (44) to retract the rods.

12. A tool for holding a blade according to claim 10, in which the retraction mechanisms consist of slugs (45) crossways to the lifters and supporting faces (46) on the clamping jaws, secant to retraction directions.

13. A tool for holding a blade according to claim 5, in which one of the transmission lifters (34), which pushes on the rear face of the divided clamping jaw, comprises an upper lifter surface (39) jutting out over a lower lifter surface (40).

14. A tool for holding a blade according to claims 7 or 13, in which the lifter surfaces (32, 33) of the activation lifter are spaced out such that the lower lifter surface (40) of the transmission lifter (34) of the divided clamping jaw (18) continues to push on the clamping jaw after the other transmission lifter (35) has gone beyond the other lifter surface (33) of the activation lifter.

15. A tool according to claim 1, in which the control system comprises a screw transmission (29).

16. A tool according to claim 1, in which the lock (47) comprises a rotating latch (50) and a tightening nut engaged on an axis traversing the frame.

17. A tool according to claim 1, in which the frame comprises a canvas (17) for lateral support of the blade between the lower supporting faces (42, 43) and for increased rigidity of the tool.

18. A tool according to claim 17, in which the canvas (17) comprises a lower face (60) for stopping the upward movement of a friction welding flange of the blade.

19. A tool according to claim 1, characterised in that it is designed to allow successive welding of all the blades of a disk, without having to remove the tool from the machine.

20. A tool according to claim 18, in which the canvas (17) will be able to be removed in order to release the tool after welding the final blade.

21. A tool according to claim 18, in which the blade has been notched with recesses (8, 9) for receiving the clamping jaws (18, 19) at leading and trailing edge positions (3, 4).

22. A process for using the tool according to claim 1, including the step of welding the blade held on the tool.

23. A process according to claim 22, wherein the welding step is friction welding.

* * * * *